United States Patent
Kogure et al.

(10) Patent No.: US 7,054,908 B2
(45) Date of Patent: May 30, 2006

(54) COMMUNICATION TERMINAL, E-MAIL RECEIVING METHOD, PROGRAM AND STORAGE MEDIUM

(75) Inventors: Shinya Kogure, Ibaraki (JP); Naoya Watanabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 10/386,695

(22) Filed: Mar. 13, 2003

(65) Prior Publication Data
US 2003/0182384 A1    Sep. 25, 2003

(30) Foreign Application Priority Data
Mar. 25, 2002   (JP) ............................. 2002-084238

(51) Int. Cl.
*G06F 13/00* (2006.01)
(52) U.S. Cl. ...................................... 709/206; 709/224
(58) Field of Classification Search ........ 709/200–203, 709/205–207, 217–224
See application file for complete search history.

(56) References Cited

U.S. PATENT DOCUMENTS 5,754,778 A * 5/1998 Shoujima .................... 709/206
6,181,928 B1   1/2001 Moon ......................... 455/415
6,189,027 B1 * 2/2001 Haneda et al. ............... 709/206
6,898,627 B1 * 5/2005 Sekiguchi .................... 709/217
6,982,803 B1 * 1/2006 Eguchi ....................... 358/1.15
2002/0103872 A1   8/2002 Watanabe .................... 709/206

FOREIGN PATENT DOCUMENTS

| EP | 0 993 165 | 4/2000 |
| EP | 0 994 608 | 4/2000 |
| GB | 2 331 423 | 5/1999 |

* cited by examiner

*Primary Examiner*—Moustafa M. Meky
(74) *Attorney, Agent, or Firm*—Fitzpatrick, Cella, Harper & Scinto

(57) ABSTRACT

A communication terminal device which is connected to a mail server for acquiring E-mail, and has storage unit for storing the acquired E-mail data, the terminal device detects a mail-status notification signal transmitted from the mail server, determines whether or not there is incoming mail by analyzing the mail-status notification signal, refers to available capacity of the storage unit if it is determined that there is incoming mail, thereby determines whether or not E-mail data relating to the incoming mail can be stored, and exercising control in such a manner that acquisition of E-mail is performed if it has determined that the E-mail data relating to the incoming mail can be stored, and in such a manner that no acquisition of E-mail is performed if it has determined that the E-mail data relating to the incoming mail cannot be stored.

14 Claims, 5 Drawing Sheets

COMMUNICATION TERMINAL, E-MAIL RECEIVING METHOD, PROGRAM AND STORAGE MEDIUM

FIELD OF THE INVENTION

This invention relates to a communication terminal device connected to a public network and capable of sending and receiving E-mail, and a processing method, program and storage medium for receiving E-mail with this communication terminal device.

BACKGROUND OF THE INVENTION

In a conventional mail system that has been provided, E-mail (referred to simply as "mail" below) that has been sent from a communication terminal on the transmitting side via the Internet is stored by a mail server, and a communication terminal on the receiving side accesses the mail server via a public network and extracts the stored mail addressed to this terminal. Communications companies that have appeared recently provide mail-status notification services in which a communication terminal on the receiving side is notified of the fact that mail from a terminal on the transmitting side has arrived at a mail server (this notification shall be referred to as "mail notification"), or in which when mail is no longer being stored in a mail server as a result of the communication terminal on the receiving side having acquired the mail by accessing the mail server, the communication terminal on the receiving side is notified of the fact that mail is no longer present at the mail server (this notification shall be referred to as "no-mail notification").

In a communication terminal already available on the market, the terminal originates a call automatically (this is generally referred to as a "dial-up connection") upon receiving mail notification and then actually acquires the mail.

However, in case of a terminal that does not have a very large memory capacity provided as a so-called "inbox" for storing E-mail data, there are instances where, despite the arrival of newly received mail, there is not enough memory capacity available to store the mail. If a dial-up connection is made automatically in response to receipt of mail notification in such case, the terminal will be billed for a communication fee irrespective of the fact that mail cannot actually be received. As a consequence, the user must bear the cost.

SUMMARY OF THE INVENTION

Accordingly, an object of the present invention is to solve the aforementioned problem encountered in the prior art.

According to the present invention, the foregoing object is attained by providing a communication terminal device which is connected to a mail server for acquiring E-mail, and has storage unit for storing the acquired E-mail data, the terminal device detects a mail-status notification signal transmitted from the mail server, determines whether or not there is incoming mail by analyzing the mail-status notification signal, refers to available capacity of the storage unit if it is determined that there is incoming mail, thereby determines whether or not E-mail data relating to the incoming mail can be stored, and exercises control in such a manner that acquisition of E-mail is performed if it has determined that the E-mail data relating to the incoming mail can be stored, and in such a manner that no acquisition of E-mail is performed if it has determined that the E-mail data relating to the incoming mail cannot be stored.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 1:
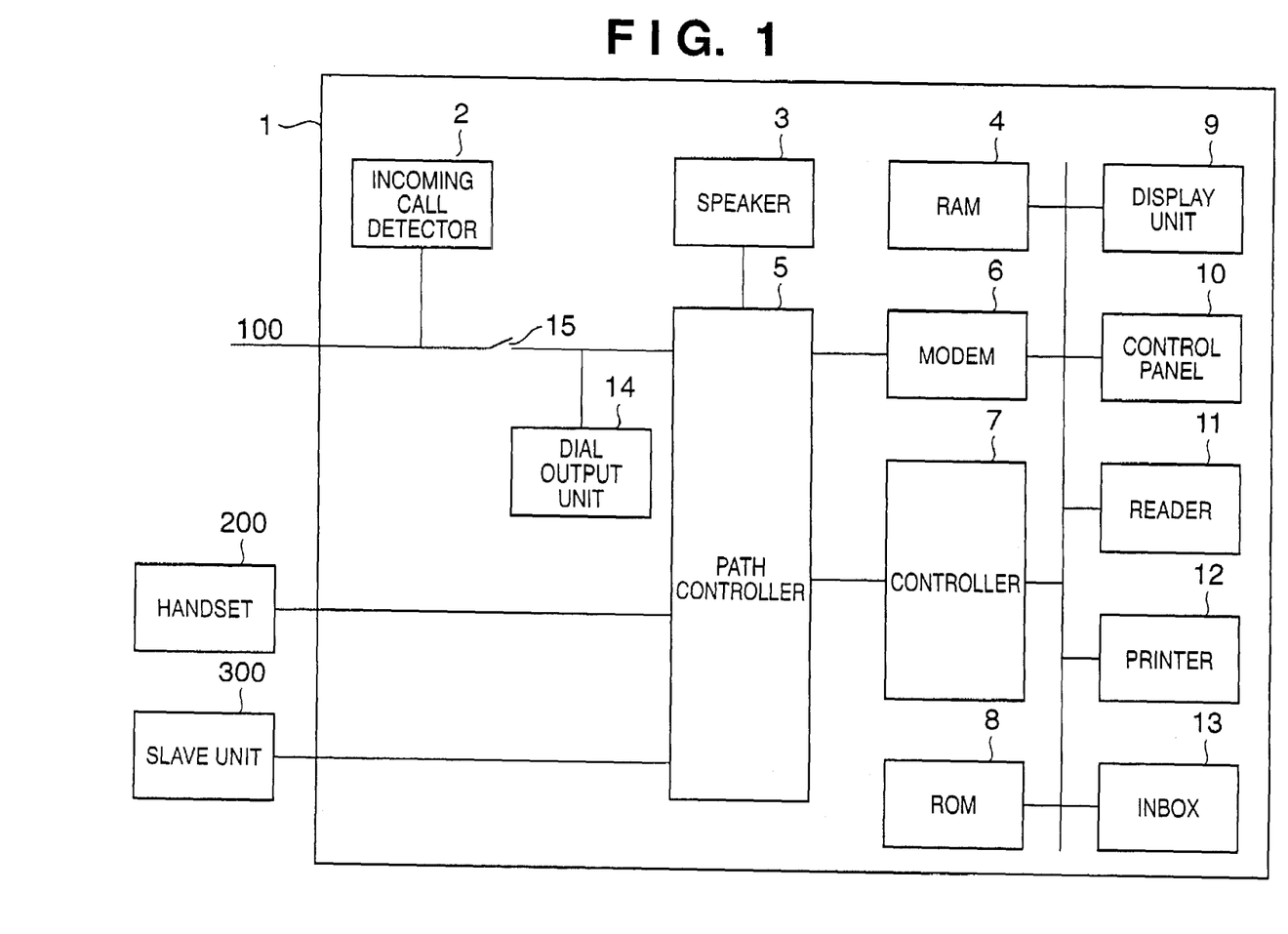
FIG. 1 is a block diagram illustrating the structure of a communication terminal device according to an embodiment of the present invention.

A preferred embodiment of the present invention will now be described with reference to the drawings, in which FIG. 1 is a block diagram illustrating a mail terminal according to one embodiment of the invention. This mail terminal may be a facsimile machine, a stationary telephone or a mobile telephone, etc.

As shown in FIG. 1, a mail terminal 1 comprises a main unit, a handset 200 and a slave unit 300. The mail terminal 1 is connected to a subscriber line or to a wireless communication channel 100. The main body includes a controller 7 for controlling the overall device in accordance with a control program that has been stored in a ROM 8.

The path controller 5, which controls the path inside and outside of the device, exercises control in accordance with a command from the controller 7. For example, the path controller 5 connects the communication channel 100 to a modem 6, which performs facsimile communication and detects various signals from an exchange; makes an extension call possible by connecting the handset 200 and the slave unit 300 connect via an RF unit (not shown); and connects the modem 6 and a speaker 3 for outputting a tone signal generated by the modem 6.

A RAM 4 has a work area used when the controller 7 executes various processing, and a VRAM area for storing display data on a display unit 9.

An incoming call detector 2 monitors a call signal that arrives from the communication channel 100 and a start-up signal (CAR) of an information receiving terminal and notifies the controller 7 of the result of detection. If necessary, the controller 7 drives a line connection relay 15 based upon this information, thereby acquiring a line and making communication possible. When facsimile reception is carried out, the modem 6 demodulates a signal that arrives, or modulates a signal that is sent, via the communication path under these conditions, whereby communication is performed. A received image is stored temporarily in the work area of the RAM 4, the data is extracted from the work area successively and is manipulated into print data so that the image may be printed out by a printing unit 12.

The printing unit 12 prints out received mail, already sent mail and temporarily stored mail.

In a case where facsimile transmission is carried out, the line connection relay 15 is driven to acquire a line, after which a dial output unit 14 performs dialing to effect a connection to the facsimile transmission destination. Modulation/demodulation processing by the modem 6 is executed in a manner similar to that of reception, whereby communication is achieved. Document data is stored temporarily in the work area of the RAM 4 and is read out successively by a reading unit 11, encoding processing is applied and the encoded data is modulated by the modem 6. The modulated data is output to the communication channel 100.

The display unit 9 outputs the status of communication and various information relating to the terminal, and displays various information entered by the operator from a control panel 10.

An inbox 13 is a storage area for storing E-mail data received from a mail server. The inbox 13 may be implemented by a non-volatile memory such as an EEPROM or by an SRAM, which is a memory separate from the RAM 4.

Figure 2A:
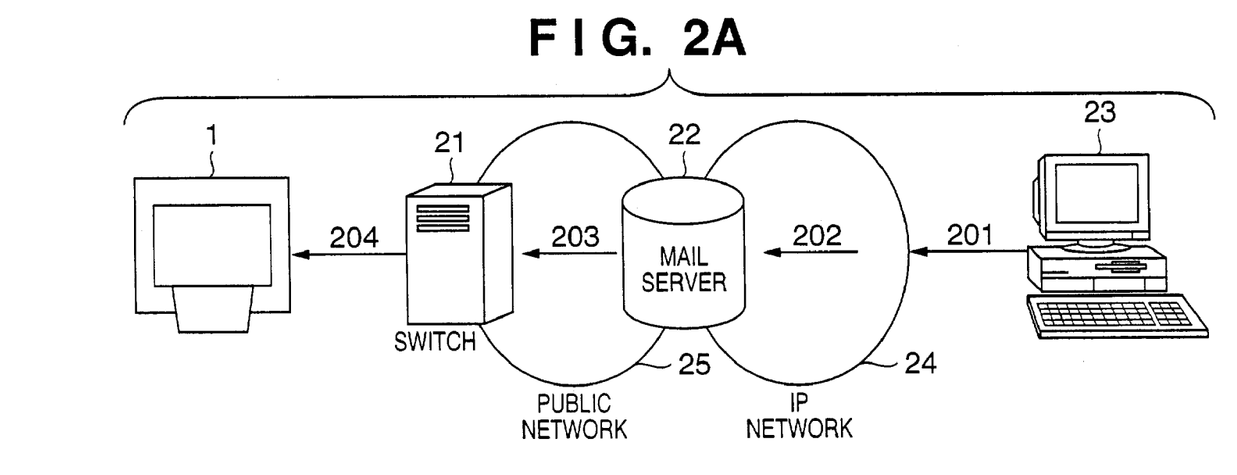
FIGS. 2A and 2B are diagram illustrating modes of connections between the communication terminal device of the present invention and the Internet.
Figure 2B:
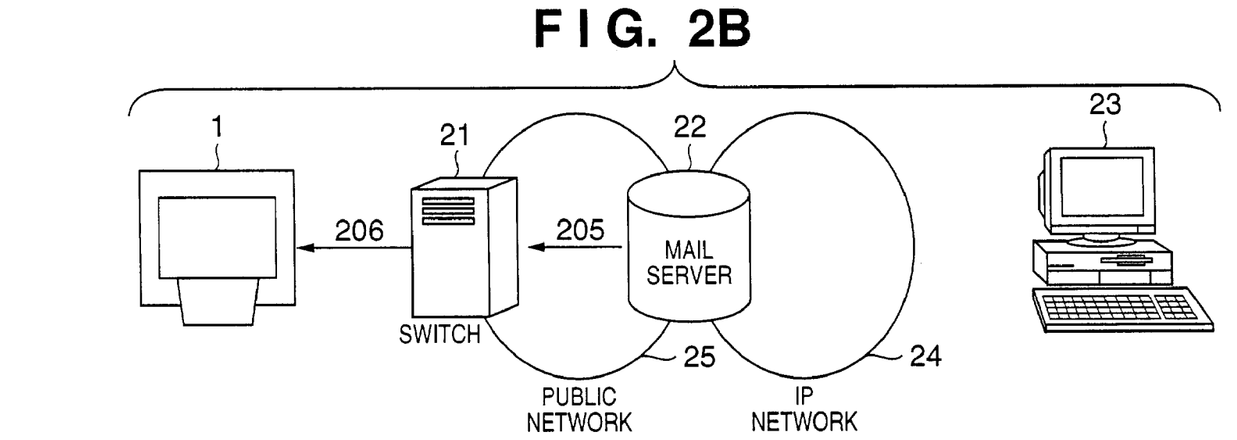

FIGS. 2A and 2B are conceptual views illustrating connections between the mail terminal 1 and a mail server 22 and IP network. These diagrams show a sequence in a case where mail is received simultaneously FIG. 2A illustrates a sequence in a case where newly received mail has arrived. Here the mail terminal 1 receives E-mail data. More specifically, a transmitting mail terminal 23 on the side that transmits the mail is a communication terminal connected to an IP network. When the terminal 23 transmits the mail to the mail terminal 1 (201), the mail is sent to the mail server 22 via the Internet 24 (202). The mail server 22 sends a subscriber switch 21 a mail notification request (203) indicating that newly received mail has arrived. On the basis of this information, the subscriber switch 21 sends mail notification to the mail terminal 1 (204).

FIG. 2B illustrates a sequence that follows receipt of mail from the mail server 22. The mail terminal 1 has a manual receiving mode and an automatic receiving mode. When the mail terminal 1 has received mail notification, the manual receiving mode allows the user to perform an operation him/herself to receive the mail, whereas the automatic receiving mode allows the mail to be received automatically. If mail has been received in either mode, the mail server 22 sends the subscriber switch 21 a no-mail notification request (205) indicating that there is no longer any mail. On the basis of this information, the subscriber switch 21 sends the no-mail notification to the mail terminal 1 (206).

Figure 3:
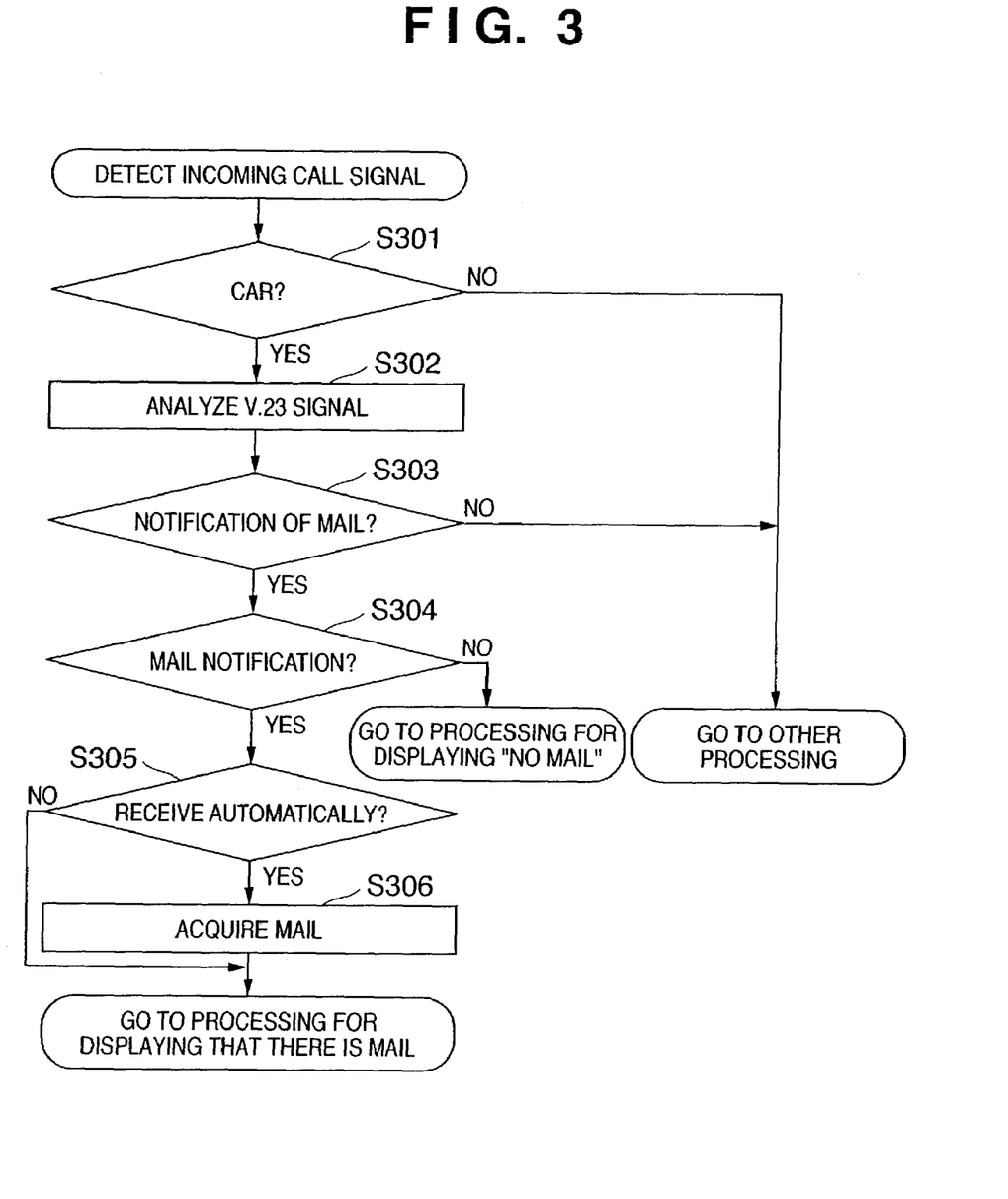
FIG. 3 is a flowchart of processing executed at the time of incoming mail in the embodiment of the present invention.

FIG. 3 is a diagram illustrating an example of a flowchart of operation at the time of an incoming call. In particular, this is a flowchart of operation performed by the mail terminal 1 when mail/no-mail notification has arrived from the subscriber switch 21.

In a case where notification of mail or no mail has been given, the subscriber switch 21 first performs a polarity reversal with respect to the mail terminal 1 and then issues the start-up signal (CAR) of this information receiving terminal. When the terminal start-up signal (CAR) is detected (S301), the mail terminal 1 acquires a line and makes a primary response to the subscriber switch 21. If the terminal start-up signal (CAR) is not detected ("NO" at S301), there are cases where the signal is a call signal (CI), in which case control proceeds to processing for an ordinary incoming-call operation. When the subscriber switch 21 detects the primary response from the terminal, the switch 21 sends information modulated by a V.23 modem. The sent information includes, in addition to mail notification and no-mail notification, the originator telephone-number information, which is used in a number display service provided by the telephone company, and incoming-call number information used in a modem dial-in service.

The mail terminal 1 receives the V.23 signal and analyzes its content (S302) and determines whether the received content is notification as to whether or not there is mail (S303). If a signal notifying of existence or non-existence of mail has been received correctly, the mail terminal 1 releases the acquired line and notifies the subscriber switch 21 that reception has been completed. If the content received is judged to indicate that mail is present ("YES" at S304), it is determined whether the device setting made by the user is for automatic reception of mail (S305). If the setting made by the user is for receiving mail automatically, then the mail is acquired (S306). After step S306, or if a "NO" decision is rendered at step S305, control proceeds to display processing for when mail notification has been received. If absence of mail is determined ("NO" at S304), control proceeds to display processing for no-mail notification.

Figure 4A:
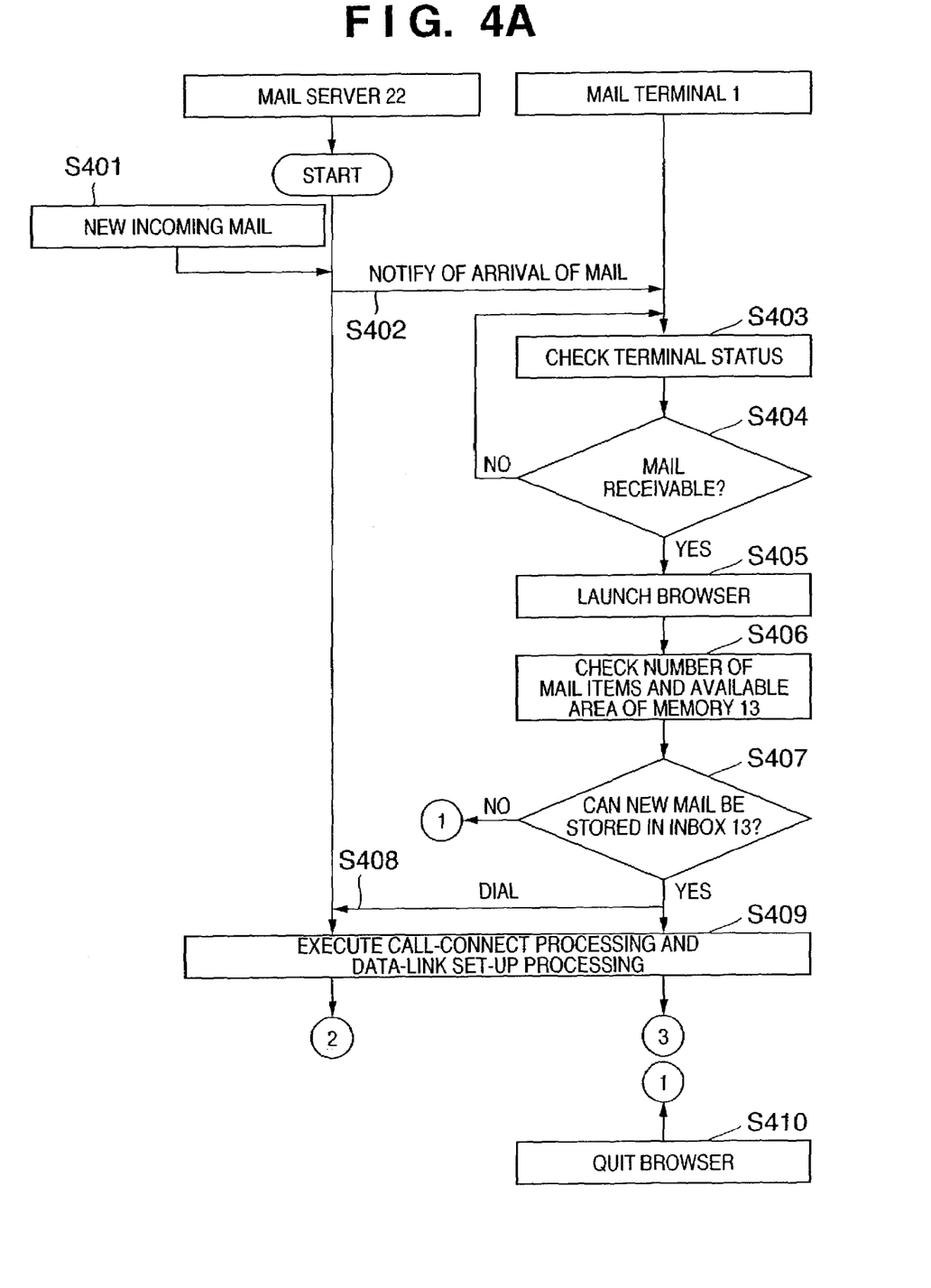
FIGS. 4A and 4B illustrate an example of a flowchart of processing for receiving mail in the embodiment of the present invention.
Figure 4B:
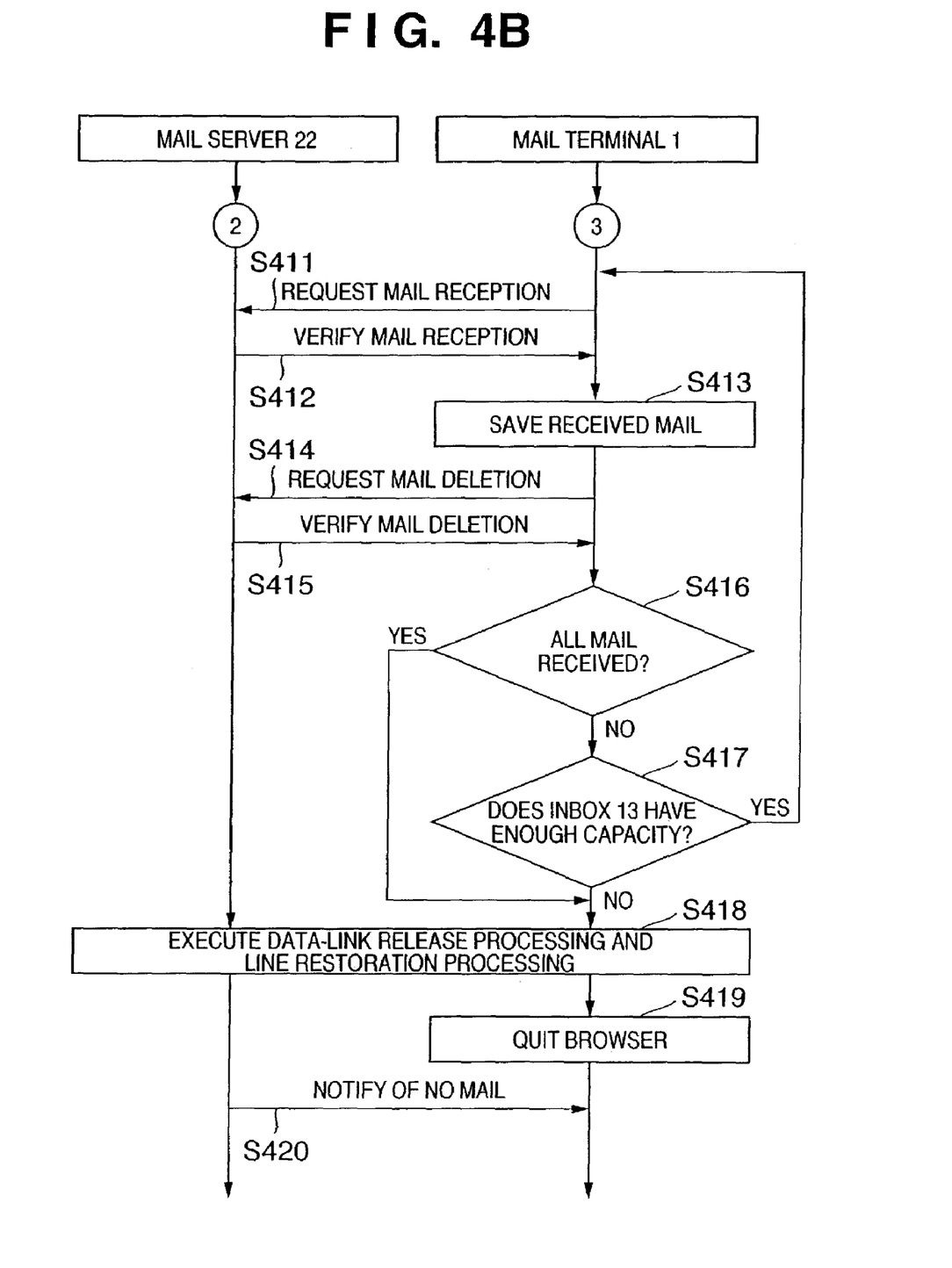

FIGS. 4A and 4B show an example of a flowchart of processing for receiving mail corresponding to an embodiment of the invention, in which the processing is executed between the mail server 22 and mail terminal 1 when mail is received automatically.

When mail newly arrives at the mail server 22 (S401), the mail server 22 notifies the mail terminal 1, which is the destination of this mail, of the fact that mail has arrived (S402). The mail terminal 1 checks its status (S403) and, when the terminal is in a state in which it can receive mail ("YES" S404), launches a browser that is for the purpose of receiving mail (S405). If the mail terminal 1 is in a state in which it cannot receive mail, it waits until it attains a state in which mail can be received. By way of example, a state in which mail cannot be received includes a case where the terminal is currently engaged in voice communication and a case where facsimile transceive processing is in progress.

The mail terminal 1 checks the number of items of mail that have been stored in the inbox 13 or the available capacity of the inbox 13 (S406) and determines whether new mail can be stored in the inbox 13 (S407). If the mail terminal 1 determines that new mail can be stored in the inbox 13, control proceeds to processing for receiving mail.

As an example of the determination processing of steps S406 and S407, assume that the number of items of mail that can be stored in the inbox 13 has been set to Md. The value of Md is compared with a number Mn of items of mail currently stored. If Md>Md holds, it is determined that mail is receivable. Alternatively, assume that the determination is made based not upon the stored number of mail items but upon the currently available capacity of the inbox 13. For example, if the currently available capacity has exceeded a certain constant value Cd (e.g., 5 KB), a determination is made that mail is receivable.

On the other hand, even in a case where the number of items of E-mail that have been stored in the inbox 13 satisfies the stipulated number, or even in a case where the available area in the inbox 13 is less than the fixed value, a determination is made that mail is receivable if there is stored E-mail data that is overwritable. More specifically, a determination that mail is receivable may be made by regarding E-mail data that has been read after being stored in the inbox 13 as being a file over which data can be written. Alternatively, a determination that mail is receivable may be made by regarding E-mail data that has resided in the inbox 13 in excess of a fixed period of time following its storage in the inbox 13 as being data over which data can be written. (The fixed period of time may be, e.g., one week, one month or six months and can be set in dependence upon the frequency with which E-mail is utilized by the user.) It is also possible to adopt an arrangement in which an overwrite-inhibit setting is selected on a per-mail-sender basis and mail from a sender that does not apply to the overwrite-inhibit setting is always made overwritable. A sender for which the overwrite-inhibit setting has been made may be particularly specified by the user or may be one registered in an address book that has been stored in the RAM 4 of mail terminal 1.

If it is determined at step S407 that new mail cannot be stored because the predetermined number of mail items have already been stored in the inbox 13 or because there is no available capacity necessary to receive mail anew, then browser-quit processing is executed without executing processing for receiving mail (S410).

When mail is received, dialing is performed at the mail terminal 1 (S408). Call-connect processing and data-link set-up processing is executed (S409) following line connection to the mail server 22. The mail terminal 1 issues a mail-receive request to the mail server 22 (S411), the mail server 22 sends mail to the mail terminal 1 (S412) and the mail terminal 1 saves the received mail in the RAM 4 within the terminal (S413).

The mail terminal 1 requests the mail server 22 to delete the received mail (S414) and the mail server 22 deletes the mail it has sent (S415). The mail terminal 1 repeats reception of mail until all mail at the mail server 22 has been received ("YES" at S416) or until the inbox 13 of the mail terminal 1 no longer has enough capacity to receive mail anew ("NO" at S417).

When reception of mail ends, data-link release processing and line restoration processing is executed (S418), the browser is quit (S419) and the mail terminal 1 returns to the standby state. If all mail has been received, the number of mail items remaining at the mail server 22 becomes zero. The mail server 22, therefore, notifies the mail terminal 1 that there is no longer mail at the mail server 22 (S420). If reception of mail ends in a state in which mail still remains at the mail server 22, as when the inbox 13 of the mail terminal 1 becomes full, the mail server 22 sends notification to the mail terminal.

According to the present invention, a mail terminal, e.g., a facsimile machine, a stationary telephone or a mobile telephone, that does not have a very large capacity for memory utilized as a so-called inbox for storing E-mail data, is capable of executing receive processing adaptively in dependence upon the capacity of the memory when newly received mail arrives. As a result, even if newly received mail resides at the mail server and mail notification is received, an unnecessary dial-up connection is not set up and it is possible to exercise control in such a manner that the user is not charged a communication fee unnecessarily.

Further, mailed deemed to be no longer necessary for the user because a considerable period of time has elapsed since its receipt, or mail that the user does not especially wish to be left stored in the inbox, is dealt with as data that can be written over, and newly arrived mail is given priority and is written over this mail. As a result, even if the user him/herself does not delete mail that has become unnecessary, deletion of unnecessary mail and clean-up within the inbox can be performed at the same time as execution of processing for receiving mail.

Thus, in accordance with the present invention as described above, it is possible to provide a communication terminal device in which when the communication terminal can no longer receive mail, an unnecessary dial-up connection is not set up if notification of mail is received, thereby assuring that the user will not be charged an unnecessary communication fee.

Further, by giving newly received mail priority and writing it over unnecessary mail in mail that has already been stored in an inbox, clean-up of the inbox can be executed automatically.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the described embodiments and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes. Furthermore, besides aforesaid functions according to the above described embodiments are realized by executing the program codes which are read by a computer, the present invention includes a case where an OS (operating system) or the like working on the computer performs a part or entire processes in accordance with designations of the program codes and realizes functions according to the above described embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above described embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A communication terminal device having mail acquisition unit adapted to accommodate a communication line connected to a mail server that provides an E-mail service, and acquiring E-mail from the mail server, and storage unit adapted to store E-mail data acquired by the acquisition unit, said communication terminal device comprising:

status-notification detecting unit adapted to detect a mail-status notification signal transmitted from the mail server;

incoming-call determination unit adapted to determine whether or not there is incoming mail by analyzing the mail-status notification signal detected by said status-notification detecting unit;

storage possible/impossible determination unit adapted to refer to available capacity of the storage unit if said incoming-mail determination unit has determined that there is incoming mail, thereby determining whether or not E-mail data relating to the incoming mail can be stored; and mail receiving unit adapted to exercise control in such a manner that acquisition of E-mail is performed by the mail acquisition unit if said storage possible/impossible determination unit has determined that the E-mail data relating to the incoming mail can be stored, and in such a manner that no acquisition of E-mail is performed by the mail acquisition unit if said storage possible/impossible determination unit has determined that the E-mail data relating to the incoming mail cannot be stored.

2. The device according to claim 1, wherein said storage possible/impossible determination unit has overwrite determination unit adapted to determine whether the E-mail data that has been stored in the storage means includes overwritable data;

wherein said storage possible/impossible determination unit determines that the E-mail data relating to the incoming mail cannot be stored if said overwrite determination unit determines that the stored E-mail data includes no overwritable data.

3. The device according to claim 1, wherein if an available area in the storage unit is less a prescribed amount of data, then said storage possible/impossible determination unit determines that E-mail data relating to the incoming mail cannot be stored.

4. The device according to claim 3, wherein the number of items of E-mail that can be stored in the storage unit is limited to a predetermined number, and said storage possible/impossible determination unit determines that E-mail data relating to the incoming mail cannot be stored if the number of items of E-mail that have been stored in the storage unit has attained the predetermined value.

5. The device according to claim 1, further comprising overwrite data decision unit for deciding overwritable data in the E-mail data that has been stored in the storage unit;

wherein said storage possible/impossible determination unit determines that the E-mail data relating to the incoming mail can be stored if overwritable data has been decided by said overwrite data decision unit.

6. The device according to claim 1, further comprising line connection control unit adapted to control connection of a communication line in order to receive E-mail;

wherein after the status-notification signal is detected by said status-notification detecting unit, said line connection control unit releases the communication line;

if said storage possible/impossible determination unit has determined that the E-mail data relating to the incoming mail can be stored, then, after the line is set up by said line connection control unit, said mail receiving unit exercises control in such a manner that acquisition of E-mail is performed by said mail acquisition unit.

7. A processing method for receiving E-mail in a communication terminal device having a mail acquisition unit adapted to accommodate a communication line connected to a mail server that provides an E-mail service, and acquiring E-mail from the mail server, and a storage unit adapted to store E-mail data acquired by the acquisition unit, said method comprising:

a status-notification detecting step of detecting a mail-status notification signal transmitted from the mail server;

an incoming-call determination step of determining whether or not there is incoming mail by analyzing the mail-status notification signal detected by said status-notification detecting step;

a storage possible/impossible determination step of referring to available capacity of the storage unit if it has been determined by said incoming-mail determination step that there is incoming mail, thereby determining whether or not E-mail data relating to the incoming mail can be stored; and a mail receiving step of exercising control in such a manner that acquisition of E-mail is performed by said mail acquisition unit if it has been determined by said storage possible/impossible determination step that the E-mail data relating to the incoming mail can be stored, and in such a manner that no acquisition of E-mail is performed by said mail acquisition step if it has been determined by said storage possible/impossible determination step that the E-mail data relating to the incoming mail cannot be stored.

8. The method according to claim 7, wherein said storage possible/impossible determination step has an overwrite determination step of determining whether the E-mail data that has been stored in the storage unit includes overwritable data;

wherein said storage possible/impossible determination step determines that the E-mail data relating to the incoming mail cannot be stored if said overwrite determination step determines that the stored E-mail data includes no overwritable data.

9. The method according to claim 7, wherein if an available area in the storage unit is less a prescribed amount of data, then said storage possible/impossible determination step determines that E-mail data relating to the incoming mail cannot be stored.

10. The method according to claim 9, wherein the number of items of E-mail that can be stored in the storage unit is limited to a predetermined number, and said storage possible/impossible determination step determines that E-mail data relating to the incoming mail cannot be stored if the number of items of E-mail that have been stored in the storage unit has attained the predetermined value.

11. The method according to claim 7, further comprising an overwrite data decision step of deciding overwritable data in the E-mail data that has been stored in the storage unit;

wherein said storage possible/impossible determination step determines that the E-mail data relating to the incoming mail can be stored if overwritable data has been decided by said overwrite data decision step.

12. The method according to claim 7, further comprising a line connection control step of controlling connection of a communication line in order to receive E-mail;

wherein after the status-notification signal is detected by said status-notification detecting step, said line connection control step releases the communication line;

if said storage possible/impossible determination step has determined that the E-mail data relating to the incoming mail can be stored, then, after the line is set up by said line connection control step, said mail receiving step exercises control in such a manner that acquisition of E-mail is performed by said mail acquisition unit.

13. An E-mail reception processing program for causing a computer to execute the processing method for receiving E-mail set forth in any one of claims 7 to 12.

14. A computer-readable information storage medium storing the E-mail reception processing program set forth in claim 13.

* * * * *